(12) United States Patent
Blaszynski

(10) Patent No.: US 7,416,198 B2
(45) Date of Patent: Aug. 26, 2008

(54) STEERING DAMPER TO DRAG LINK ATTACHMENT CLAMP AND METHOD

(75) Inventor: Brian Blaszynski, St. Catharines (CA)

(73) Assignee: TRW Automotive U.S. LLC, Livonia, MI (US)

( * ) Notice: Subject to any disclaimer, the term of this patent is extended or adjusted under 35 U.S.C. 154(b) by 478 days.

(21) Appl. No.: 11/104,795

(22) Filed: Apr. 13, 2005

(65) Prior Publication Data

US 2006/0232036 A1  Oct. 19, 2006

(51) Int. Cl.
*B62D 7/22* (2006.01)
(52) U.S. Cl. ............. 280/89.12; 280/93.51; 280/93.511
(58) Field of Classification Search .............. 280/89.12, 280/93.502, 93.511, 93.506, 93.51
See application file for complete search history.

(56) References Cited

U.S. PATENT DOCUMENTS

| | | | | |
|---|---|---|---|---|
| 3,674,249 A | * | 7/1972 | McGee .................. | 267/52 |
| 3,938,822 A | * | 2/1976 | Guerriero .............. | 280/86.758 |
| 4,634,168 A | * | 1/1987 | Fuchs et al. ............. | 296/35.1 |
| 5,080,520 A | * | 1/1992 | Wood, Jr. ................ | 403/77 |
| 5,249,817 A | | 10/1993 | Brühl | |
| 5,286,056 A | * | 2/1994 | Speich .................. | 280/777 |
| 5,306,095 A | | 4/1994 | Snitgen et al. | |
| 5,797,618 A | | 8/1998 | Brokhole | |
| 5,851,015 A | | 12/1998 | Klosterhaus | |
| 6,039,337 A | | 3/2000 | Urbach | |
| 6,074,125 A | * | 6/2000 | Krawczak ............... | 403/374.3 |
| 6,086,075 A | | 7/2000 | O'Bryan et al. | |
| 6,142,495 A | | 11/2000 | Kim | |
| 6,659,475 B2 | | 12/2003 | Clements et al. | |
| 6,685,381 B1 | | 2/2004 | Sugita et al. | |
| 6,719,312 B2 | | 4/2004 | Thompson et al. | |
| 6,966,567 B2 | * | 11/2005 | McLaughlin ............. | 280/93.51 |
| 7,163,216 B2 | * | 1/2007 | McLaughlin ............. | 280/93.51 |
| 7,182,544 B2 | * | 2/2007 | Irrer ......................... | 403/43 |

* cited by examiner

*Primary Examiner*—Toan C To
(74) *Attorney, Agent, or Firm*—MacMillan, Sobanski & Todd, LLC

(57) ABSTRACT

The invention contemplates steering damper to drag link attachment clamp and method. A vehicle steering linkage has a steering damper including a drag link attachment joint, and a mounting bolt operatively engaging the drag link attachment joint. A drag link assembly has a main drag link socket assembly including a main rod portion; a clamp includes a main body and a pair of legs extending therefrom, with the main body defining a rod receiving bore within which is mounted the main rod portion of the drag link socket assembly, and the legs each include a bolt hole through which the mounting bolt extends; and a weld securing the main body of the clamp to the main rod portion. A nut engages the bolt such that the legs are pulled closer together, causing the main body to apply a clamping load to the main rod portion.

17 Claims, 3 Drawing Sheets

STEERING DAMPER TO DRAG LINK ATTACHMENT CLAMP AND METHOD

BACKGROUND OF INVENTION

The present invention relates generally to automotive vehicle steering and suspensions systems and, in particular, to a steering damper to drag link assembly attachment.

Automotive vehicle steering and suspension systems are well known and are used to steer the front wheels as well as support the vehicle while providing a smooth ride. It is also desirable to damp forces exerted on the wheels of a vehicle in order to keep them from being transferred to the body and steering wheel of a vehicle, which, in turn, results in a more comfortable driving experience. In order to minimize the forces transmitted to a steering wheel through the steering linkage, many steering and suspension systems include a steering damper connected between a drag link assembly (also sometimes called a tie rod assembly, depending upon the particular steering linkage configuration) and an axle housing. The steering damper is a shock absorber that reduces undesirable movement—known as bump steer—that otherwise might be transmitted to the steering wheel when one of the front tires encounters a road surface irregularity.

In order to attach the steering damper to the drag link assembly, some have done so by drilling a tapered hole through a flat pad portion formed on a solid rod of the drag link assembly. The steering damper is then mounted to the rod with a tapered stud in order to form a tapered pin joint. This positively locates the steering damper (both axially and rotationally) in the correct position on the drag link assembly. But this type of attachment requires more forging and machining operations than is desired, and as a result costs more than is desired for this attachment.

Others, when employing a hollow tube for the rod portion, have swaged a portion of the hollow tube down to a smaller diameter at the location where the steering damper is to be attached. A bracket, with an opening matching the smaller diameter, can then be positively located axially by mounting it on the smaller diameter portion of the tube. For the steering linkage arrangement that employs the hollow tube, this bracket must be able to rotated relative to the tube while the drag link assembly is being installed and adjusted, so it works adequately. This type of attachment, however, does not positively locate the bracket rotationally, and is more applicable to a hollow tube that can be easily swaged rather than a drag link assembly that employs solid rods. Thus, for drag link assemblies that employ a solid tube and/or require positive rotational retention to maintain the proper orientation of the steering damper attachment assembly, this type of attachment is not particularly desirable either.

SUMMARY OF INVENTION

An embodiment of the present invention contemplates a drag link assembly of a vehicle steering linkage. The drag link assembly may include a main drag link socket assembly including a main rod portion, and a clamp including a curvilinear main body and a pair of spaced apart legs extending therefrom, the main body defining a rod receiving bore within which is mounted the main rod portion of the drag link socket assembly, the legs each including a mounting bolt hole adapted to receive a mounting bolt extending through both of the mounting bolt holes, and the legs adapted to be pulled closer together when a nut operatively engages the mounting bolt thereby causing the main body to apply a clamping load to the main rod portion. A weld is located between and secures the main body of the clamp to the main rod portion whereby the clamp is maintained at a predetermined axial location and rotational orientation on the main rod portion.

An embodiment of the present invention contemplates a steering linkage for use in an automotive vehicle. The steering linkage may include a steering damper including a first end having a drag link attachment joint, a mounting bolt operatively engaging the drag link attachment joint and including a shank extending therefrom, and a drag link assembly. The drag link assembly may have a main drag link socket assembly including a main rod portion; a clamp including a curvilinear main body and a pair of spaced apart legs extending therefrom, the main body defining a rod receiving bore within which is mounted the main rod portion of the drag link socket assembly, the legs each including a mounting bolt hole through which the shank of the mounting bolt extends; and a weld securing the main body of the clamp to the main rod portion whereby the clamp is maintained at a predetermined axial location and rotational orientation on the main rod portion. Also, a nut operatively engages the mounting bolt against a bias of the legs such that the legs are pulled closer together, causing the main body to apply a clamping load to the main rod portion.

An embodiment of the present invention contemplates a method for attaching a steering damper, having a drag link attachment joint, to a drag link assembly, having a main drag link socket assembly with a main rod portion, in a vehicle, the method comprising the steps of: providing a clamp including a curvilinear main body and a pair of spaced apart legs extending therefrom, the main body defining a rod receiving bore adapted for receiving the main rod portion of the drag link socket assembly, with the legs each including a mounting bolt hole; mounting the main body of the clamp on the main rod portion at a predetermined axial location and rotational orientation; tack welding the main body of the clamp to the to the main rod portion at the predetermined axial location and rotational orientation; engaging a mounting bolt with the drag link attachment joint; extending a shank of the mounting bolt through the mounting bolt holes of the clamp; and engaging a nut on the mounting bolt against a bias of the legs such that the legs are pulled closer together, causing the main body to apply a clamping load to the main rod portion.

The present invention advantageously provides an improved way to attach a steering damper to a drag link assembly. The present invention is relatively easy to install, providing positive axial and rotational location for the clamp while attaching the steering damper to the drag link assembly. Moreover, the attachment is cost effective since it minimizes forging and machining operations needed to allow for proper installation.

Another advantage of an embodiment of the present invention is that the clamp can be employed with a rod portion that is solid or tubular.

DETAILED DESCRIPTION

Figure 1:
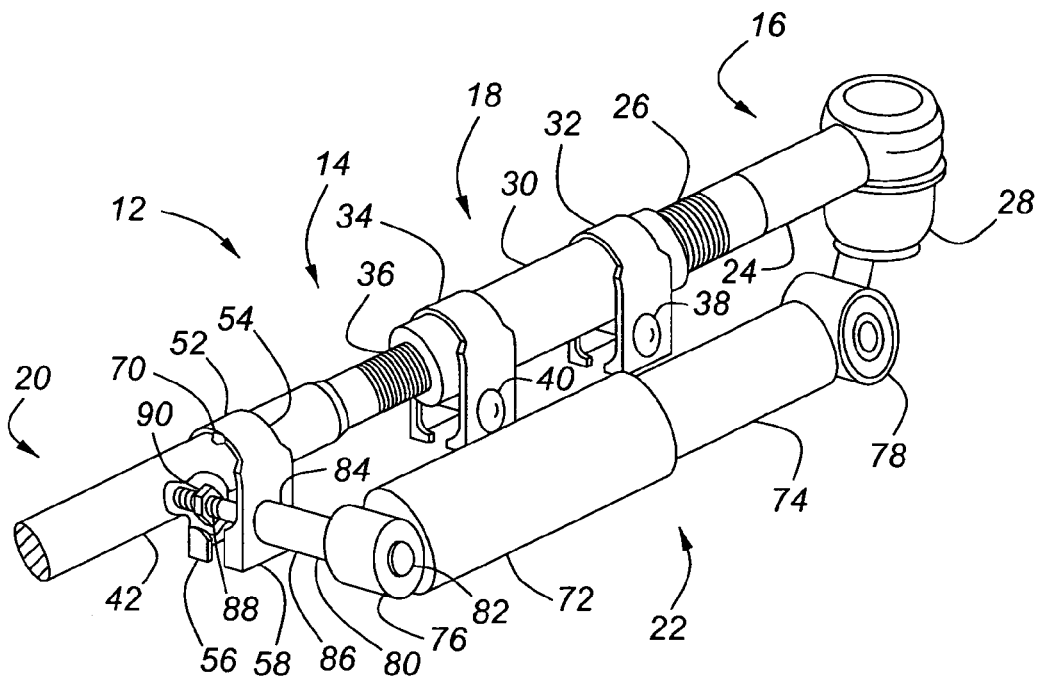
FIG. 1 is a perspective, partially broken away view of a portion of a vehicle steering linkage in accordance with the present invention.
Figure 2:
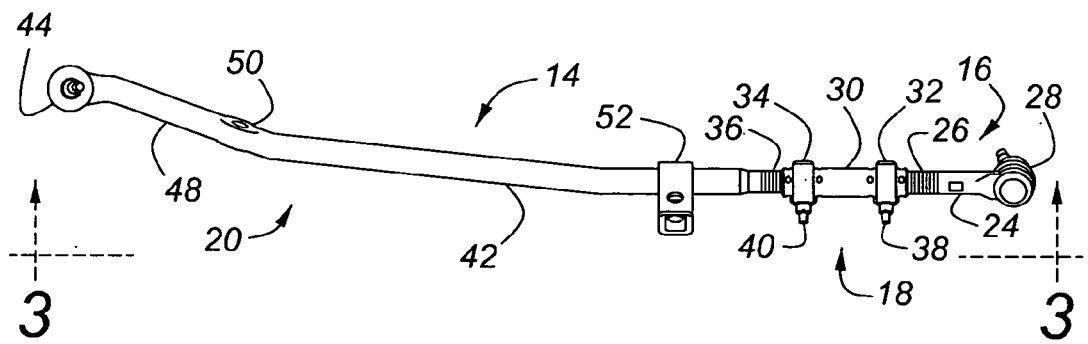
FIG. 2 is a side view of a drag link assembly in accordance with the present invention.
Figure 3:
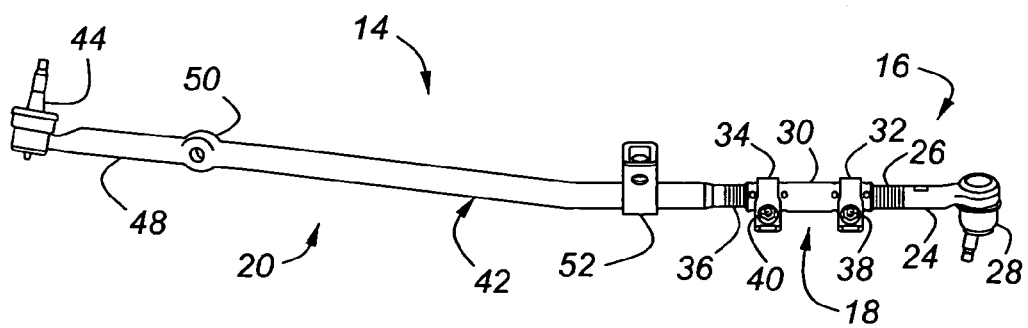
FIG. 3 is a view of the drag link assembly looking in the direction of line 3-3 in FIG. 2.

FIGS. 1-9 illustrate a portion of a steering linkage, indicated generally at 12, for a vehicle. The steering linkage 12 includes a drag link assembly 14, which is comprised of an outer drag link socket assembly 16, a drag link adjuster 18, and a main drag link socket assembly 20. The drag link assembly 14 is also sometimes called a tie rod assembly, depending upon the particular type of steering linkage, so when the term "drag link" is used herein, this also includes a tie rod). The vehicle steering linkage 12 also includes a steering damper 22 that connects at one end to the drag link assembly 14 and at another end to an axle housing, not shown.

The outer drag link socket assembly 16 includes an outer rod portion 24, with adjustment threads 26 at an inner end and a first ball joint 28 at an outer end. The first ball joint 28 may connect to a steering knuckle, not shown. The first ball joint 28 and the steering knuckle will not be described in detail herein since they are both preferably conventional. The adjustment threads 26 engage with the drag link adjuster 18.

The drag link adjuster 18 includes an adjuster sleeve 30, an outer adjuster bracket 32, and an inner adjuster bracket 34. The adjuster sleeve 30 has a first set of internal threads, not shown, that engage with the adjustment threads 26 on the outer drag link socket assembly 16, and a second set of internal threads, not shown, that engage with adjustment threads 36 on the main drag link socket assembly 20. The internal threads engage with their corresponding threads 26, 36 so that when the adjuster sleeve 30 is rotated in one direction, the length of the drag link assembly 14 will decrease, and when rotated in the opposite direction, the length of the drag link assembly 14 will increase. The outer adjuster bracket 32 mounts near the outer end of the adjuster sleeve 30 and includes a first bolt and nut assembly 38, while the inner adjuster bracket 34 mounts over the inner end of the adjuster sleeve 30 and includes a second bolt and nut assembly 40. When the bolt and nut assemblies 38, 40 are tightened on their respective brackets 32, 34, they secure the threads of the adjuster sleeve 30 relative to the adjustment threads 26, 36.

The main drag link socket assembly 20 includes a main rod portion 42, with the adjustment threads 36 at an inner end and a second ball joint 44 mounted in a pocket 46 at an outer end. Preferably, the main rod portion 42 is a solid rod. The second ball joint 44 may connect to a steering knuckle, not shown. The second ball joint 44 and steering knuckle will not be described in detail herein since they are both preferably conventional. One will note that the main rod portion 42 of the main drag link socket assembly 20 includes a dogleg portion 48 and also a pad 50 with a hole therethrough for mating with another portion of the vehicle steering linkage 12. These features, in addition to the orientation of the first ball joint 28 and second ball joint 44 relative to their respective steering knuckles, require the main drag link socket assembly 20 to be oriented in the vehicle in only one particular rotational orientation. Consequently, the main drag link socket assembly 20 will have a particular orientation relative to the steering damper 22. A clamp 52, then, will need to have a particular orientation relative to the main rod portion 42 in order for it to line up with the steering damper 22 and secure the two assemblies together.

The clamp 52 (best seen in FIGS. 7-9) for securing the steering damper 22 to the drag link assembly 14 is preferably formed from stamped sheet metal in order to reduce the cost of fabrication. The clamp 52 includes a main body 54 from which a first leg 56 and an opposed second leg 58 extend. The main body 54 is formed into a cylindrical shape in order to define a rod receiving bore 60, through which the main rod portion 42 of the main drag link socket assembly 20 is received. The first leg 56 extends outward from the main body 54 and includes a first mounting bolt hole 62, and the second leg 58 also extends outward from the main body 54 and includes a second mounting bolt hole 68 that is axially aligned with the first mounting bolt hole 62. A pair of guide flanges 64 preferably extend from each side of the first leg 56 and taper down in height as they extend from adjacent to the main rod portion 42 out toward the end of the first leg 56. A second pair of guide flanges 66 preferably extend from each side of the second leg 58 and taper down in height as they extend from adjacent to the main rod portion 42 out toward the end of the second leg 58. The guide flanges 64, 66, then, will not only provide support for the first and second legs 56, 58, respectively, but, during the assembly process, will also act as guides that direct the clamp 52 onto the main rod portion 42 while causing the legs 56, 58 to flex the main body 54 outward around the main rod portion 42.

As will be discussed in more detail below, the clamp 52 is fixed at an axial location and a rotational orientation relative to the main rod portion 42 in two ways. A spot weld 70 is applied between the clamp 52 and main rod portion 42, and a clamping force is applied by the main body 54 to the main rod portion 42. This assures that the clamp 52 is and will remain located and oriented properly to mate with the steering damper 22.

The steering damper 22 includes a first telescoping part 72 mounted to a second telescoping part 74. The first telescoping part 72 is coupled to a drag link attachment joint 76, at a first end of the steering damper 22, while the second telescoping part 74 is coupled to an axle attachment joint 78, at a second end of the steering damper 22. The axle attachment joint 78 mounts to a bracket, not shown, extending from the axle housing, not shown. The steering damper 22, mounting bracket, and axle housing are preferably conventional and so will not be discussed in detail herein. The drag link attachment joint 76 is employed to mount the steering damper 22 to the drag link assembly 14.

A mounting bolt 80 engages with the drag link attachment joint 76, at a first end, and engages with the clamp 52, at a second end. The mounting bolt 80 includes a head 82 for retaining the mounting bolt 80 in the drag link attachment joint 76. A shank 84 extends from the head 82 and includes a spacer portion 86 and a threaded portion 88. The spacer portion 86 of the shank 84 has a diameter that is larger than the second mounting bolt hole 68 and a length that will space the steering damper 22 the desired distance from the drag link assembly 14. The threaded portion 88 of the shank 84 has a diameter that is smaller than the diameter of the first and second mounting bolt holes 62, 68, and a length that is long enough to extend through both legs 56, 58 of the clamp 52. A nut 90 engages the threaded portion 88 outside of the first leg 56, securing the mounting bolt 80 to the clamp 52.

Figure 4:
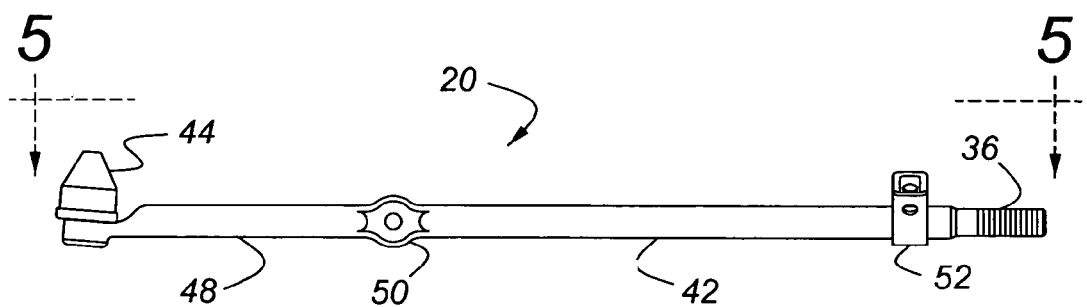
FIG. 4 is a side view of a main drag link socket assembly in accordance with the present invention.
Figure 5:
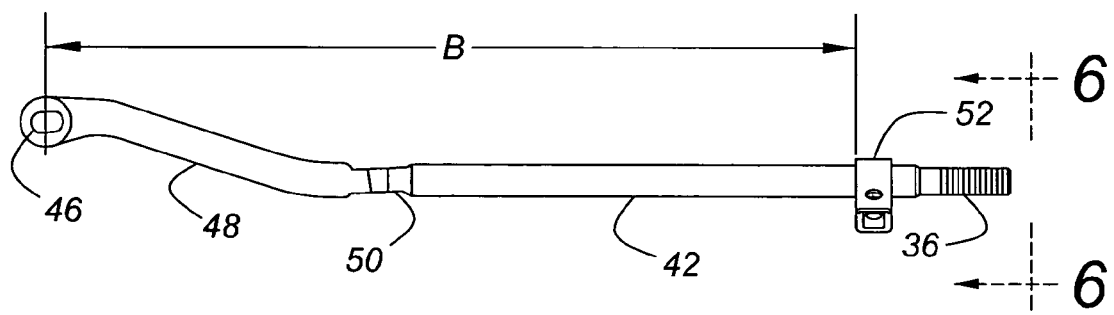
FIG. 5 is a view of the main drag link socket assembly looking in the direction of line 5-5 in FIG. 4, but without a ball joint shown.
Figure 6:
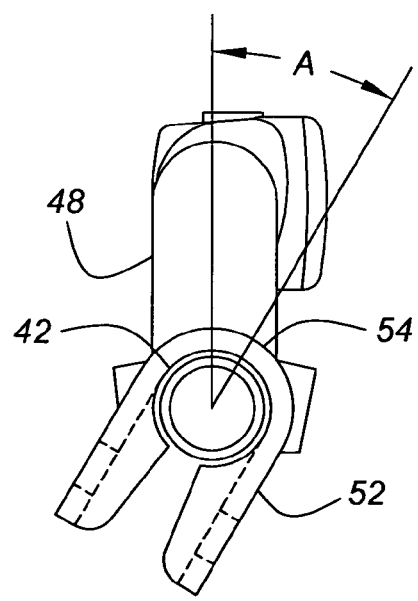
FIG. 6 is a view of the main drag link socket assembly looking in the direction of line 6-6 in FIG. 5.
Figure 7:
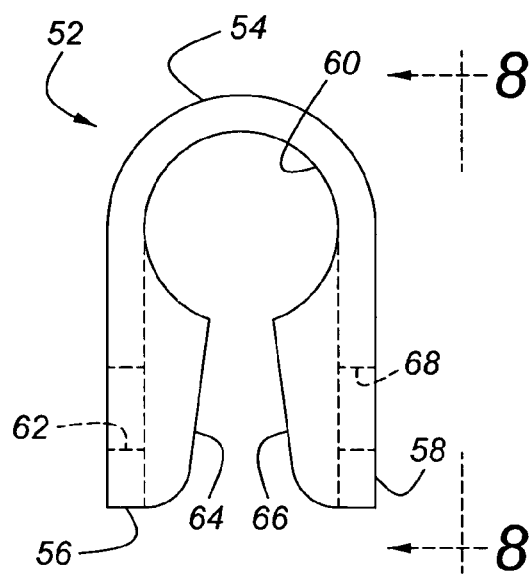
FIG. 7 is a side view of a clamp in accordance with the present invention.
Figure 8:
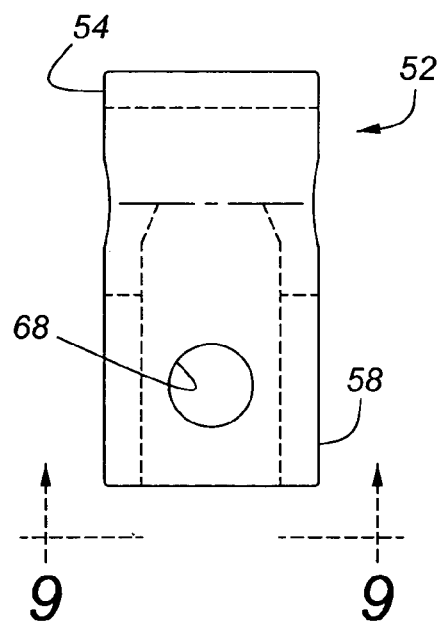
FIG. 8 is a view of the clamp looking in the direction of line 8-8 in FIG. 7.
Figure 9:
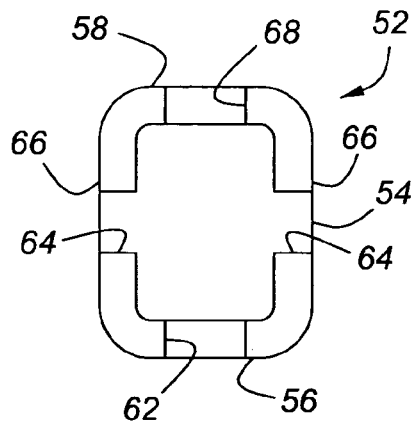
FIG. 9 is a view of the clamp looking in the direction of line 9-9 in FIG. 8.

The assembly and adjustment of the drag link assembly 14, and the attachment of the steering damper 22 thereto, will now be described. For the main drag link socket assembly 20, the second ball joint 44 is mounted to the pocket 46 of the main rod portion 42. The clamp 52—which can be mounted either before or after the second ball joint 44—is mounted on main rod portion 42 and positively located both axially and rotationally. For example, it may be oriented at an angle A (seen in FIG. 6)—with angle A being about thirty one degrees relative to the main rod portion 42—and located at an axial distance B (as seen in FIG. 4)—with distance B being about six hundred forty six millimeters from the center of the pocket 46. Of course, the actual axial distance B and orientation angle A needed will vary depending upon the particular vehicle and steering and suspension system.

With the clamp 52 positively located, the small weld 70, such as spot weld or tack weld, is then applied between the clamp 52 and the main rod portion 42. Although this spot weld 70 is generally not sufficient to hold the clamp 52 in place relative to the main rod portion 42 during vehicle operation, it is sufficient to hold it during shipping and while the drag link assembly 14 is being installed and adjusted on a vehicle. By applying only the small weld 70, the cost and time spent on this operation is minimized, yet, after installation and adjustment, the clamp 52 is in the correct location and orientation to attach the steering damper 22.

For the outer drag link socket assembly 16, the first ball joint 28 is mounted on the outer rod portion 24. The inner and outer adjuster brackets 32, 34 are mounted on the adjuster sleeve 30, then the adjustment threads 26, 36 are engaged with the adjuster sleeve 30—thus forming the drag link assembly 14.

The drag link assembly 14 and steering damper 22 are mounted in the particular vehicle. The steering damper 22 is mounted in the vehicle by connecting the axle attachment joint 78 to the bracket extending from the axle housing. The drag link assembly 14 is mounted in the vehicle by mounting the first and second ball joints 28, 44 to their respective steering knuckles and coupling it to another portion (not shown) of the steering linkage 12. The drag link assembly 14 can now be adjusted. To adjust the distance between the ball joints 28, 44, the adjuster sleeve 30 of the drag link adjuster 18 is rotated, one way to lengthen and the other way to shorten the distance. When desired length is obtained, the bolt and nut assemblies 38, 40 on the inner and outer adjuster brackets 32, 34 are tightened to prevent the adjuster sleeve 30 from rotating. During this adjustment, the main drag link socket assembly 20 can be held in its proper rotational orientation since it does not need to rotate to adjust the length of the drag link assembly 14. This allows the clamp 52 to also remain in its proper orientation without having to be rotated relative to the main rod portion 42, thus allowing the spot weld 70 to remain intact.

The mounting bolt 80 is inserted into the drag link attachment joint 76 on the steering damper 22 and through the mounting bolt holes 62, 68 on the clamp 52. The nut 90 is threaded onto the mounting bolt 80. As torque is applied to the nut 90, the first and second legs 56, 58 of the clamp 52 are trapped between the spacer portion 86 of the bolt shank 84 and the nut 90, causing the legs 56, 58 to be drawn together. As the legs 56, 58 are drawn together, the main body 54 of the clamp 52 will squeeze tightly around the main rod portion 42, applying a clamping load to the rod 42. This clamping action—in addition to the small spot weld 70—will assure that the clamp 52 permanently maintains its proper axial location and rotational orientation on the main rod portion 42 during vehicle operation.

While certain embodiments of the present invention have been described in detail, those familiar with the art to which this invention relates will recognize various alternative designs and embodiments for practicing the invention as defined by the following claims.

What is claimed is:

1. A drag link assembly of a vehicle steering linkage comprising:
   a main drag link socket assembly including a main rod portion having a first end with a pocket and a second end having threads thereon, and the drag link assembly further includes a ball joint mounted in the pocket;
   a clamp including a curvilinear main body and a pair of spaced apart legs extending therefrom, the main body defining a rod receiving bore within which is mounted the main rod portion of the drag link socket assembly, the legs each including a mounting bolt hole adapted to receive a mounting bolt extending through both of the mounting bolt holes, and the legs adapted to be pulled closer together when a nut operatively engages the mounting bolt thereby causing the main body to apply a clamping load to the main rod portion; and
   a weld securing the main body of the clamp to the main rod portion whereby the clamp is maintained at a predetermined axial location and rotational orientation on the main rod portion.

2. The drag link assembly of claim 1 further including a drag link adjuster having an adjuster sleeve with a first end and an opposed second end, wherein the first end operatively engages the threads on the second end of the main drag link socket assembly.

3. The drag link assembly of claim 2 further including an outer drag link socket assembly with a first end having threads thereon and a second end having a second ball joint mounted thereon, wherein the threads on the outer drag link socket assembly operatively engage the second end of the adjuster sleeve.

4. The drag link assembly of claim 1 wherein the weld is a tack weld.

5. The drag link assembly of claim 1 wherein the main rod portion is a solid rod.

6. The drag link assembly of claim 1 wherein at least one of the legs includes a guide flange extending therefrom that tapers down from a first portion of the flange adjacent to the main rod portion to a second portion of the flange near an end of the at least one leg.

7. The drag link assembly of claim 1 wherein each of the legs includes a pair of spaced guide flanges extending therefrom that taper down from first portions of the flanges adjacent to the main rod portion to second portions of the flanges near ends of the legs.

8. A steering linkage for use in an automotive vehicle comprising:
   a steering damper including a first end having a drag link attachment joint;
   a mounting bolt operatively engaging the drag link attachment joint and including a shank extending therefrom;
   a drag link assembly having a main drag link socket assembly including a main rod portion having a first end with a pocket and a second end having threads thereon, and a ball joint mounted in the pocket; a clamp including a curvilinear main body and a pair of spaced apart legs extending therefrom, the main body defining a rod receiving bore within which is mounted the main rod portion of the drag link socket assembly, the legs each including a mounting bolt hole through which the shank of the mounting bolt extends; and a weld securing the main body of the clamp to the main rod portion whereby the clamp is maintained at a predetermined axial location and rotational orientation on the main rod portion; and a nut operatively engaging the mounting bolt against a bias of the legs such that the legs are pulled closer together, causing the main body to apply a clamping load to the main rod portion.

9. The steering linkage of claim 8 further including a drag link adjuster having an adjuster sleeve with a first end and an opposed second end, wherein the first end operatively engages the threads on the second end of the main drag link socket assembly.

10. The steering linkage of claim 9 further including an outer drag link socket assembly with a first end having threads thereon and a second end having a second ball joint mounted thereon, wherein the threads on the outer drag link socket assembly operatively engage the second end of the adjuster sleeve.

11. The steering linkage of claim 10 wherein the drag link adjuster further includes an adjuster bracket operatively engaging the adjuster sleeve to selectively prevent rotation of the adjuster sleeve relative to the threads on the first end of the outer drag link socket assembly.

12. The steering linkage of claim 9 wherein the drag link adjuster further includes an adjuster bracket operatively engaging the adjuster sleeve to selectively prevent rotation of the adjuster sleeve relative to the threads on the second end of the main drag link socket assembly.

13. The steering linkage of claim 8 wherein the weld is a tack weld.

14. The steering linkage of claim 8 wherein the main rod portion is a solid rod.

15. The steering linkage of claim 8 wherein at least one of the legs includes a guide flange extending therefrom that tapers down from a first portion of the flange adjacent to the main rod portion to a second portion of the flange near an end of the at least one leg.

16. A method for attaching a steering damper, having a drag link attachment joint, to a drag link assembly, having a main drag link socket assembly with a main rod portion, in a vehicle, the method comprising the steps of:

providing a clamp including a curvilinear main body and a pair of spaced apart legs extending therefrom, the main body defining a rod receiving bore adapted for receiving the main rod portion of the drag link socket assembly, with the legs each including a mounting bolt hole;

mounting the main body of the clamp on the main rod portion at a predetermined axial location and rotational orientation;

tack welding the main body of the clamp to the to the main rod portion at the predetermined axial location and rotational orientation;

threadably engaging a first end of an adjuster sleeve of a drag link adjuster to the main rod portion;

threadably engaging an opposed second end of the adjuster sleeve with an outer drag link socket assembly;

preventing the main rod portion from rotating while rotating the adjuster sleeve to thereby axially move the main rod portion relative to the outer drag link socket assembly;

engaging a mounting bolt with the drag link attachment joint;

extending a shank of the mounting bolt through the mounting bolt holes of the clamp; and engaging a nut on the mounting bolt against a bias of the legs such that the legs are pulled closer together, causing the main body to apply a clamping load to the main rod portion.

17. The method of claim 16 further including the steps of:

selectively preventing the rotation of the adjuster sleeve relative to the main rod portion; and selectively preventing the rotation of the adjuster sleeve relative to the outer drag link socket assembly.

* * * * *